United States Patent
Chaudhry et al.

(10) Patent No.: US 6,732,363 B1
(45) Date of Patent: May 4, 2004

(54) SUPPORTING INTER-PROCESS COMMUNICATION THROUGH A CONDITIONAL TRAP INSTRUCTION

(75) Inventors: Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 577 days.

(21) Appl. No.: 09/592,050

(22) Filed: Jun. 12, 2000

Related U.S. Application Data

(60) Provisional application No. 60/185,246, filed on Feb. 28, 2000.

(51) Int. Cl.$^7$ ................................................. G06F 9/46
(52) U.S. Cl. ........................................ 719/318; 719/310
(58) Field of Search ................................ 709/310–318; 712/8

(56) References Cited

U.S. PATENT DOCUMENTS 5,692,169 A * 11/1997 Kathail et al. ............... 712/244

FOREIGN PATENT DOCUMENTS

WO    WO 90/14629     11/1990

OTHER PUBLICATIONS

Hammond et al., Data Speculation Support for a Chip Multiprocessor, ACM, pp. 58–69.*

Nikhil et al., Parallel Multithreaded Data Processing System, WO 90/14629.*

Publication entitled "The Superthreaded Processor Architecture," by Jenn–Yuan Tsai et al., IEEE Transactions on Computers, vol. 48, No. 9, Sep. 1999, XP–000862502.

Publication entitled "Data Speculation Support for a Chip Multiprocessor," by Lance Hammond et al., Stanford University, 1998 ACM, XP–000787299.

* cited by examiner

Primary Examiner—Meng-Al T. An
Assistant Examiner—Diem Cao
(74) Attorney, Agent, or Firm—Park, Vaughan & Fleming LLP

(57) ABSTRACT

One embodiment of the present invention provides a system that supports inter-process communication through use of a conditional trap instruction. The system operates by allowing a first process to send a communication to a second process by writing to a register that is visible to the second process. The second process then examines a value in the register by executing the conditional trap instruction. If the value in the register satisfies a condition specified by the conditional trap instruction, the system executes a trap handling routine that takes an action in response to the communication from the first process. If the value in the register does not satisfy the condition, the system takes no action and proceeds with execution of the code. In one embodiment of the present invention, the first process writes to the register by causing an interrupt that writes to the register.

27 Claims, 7 Drawing Sheets

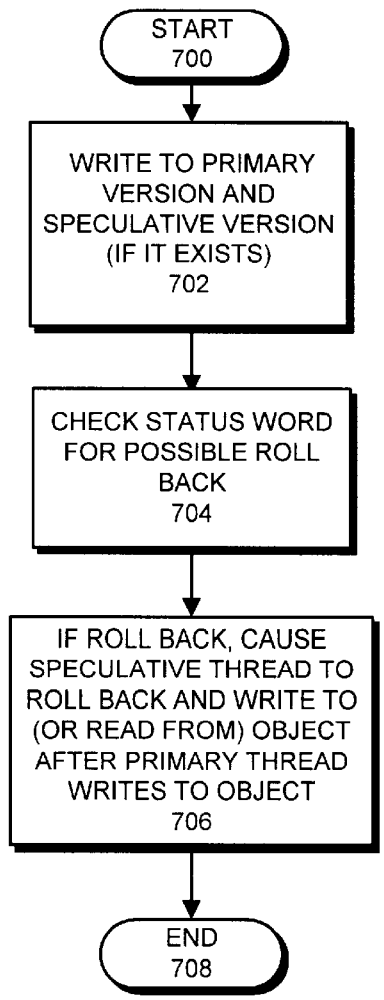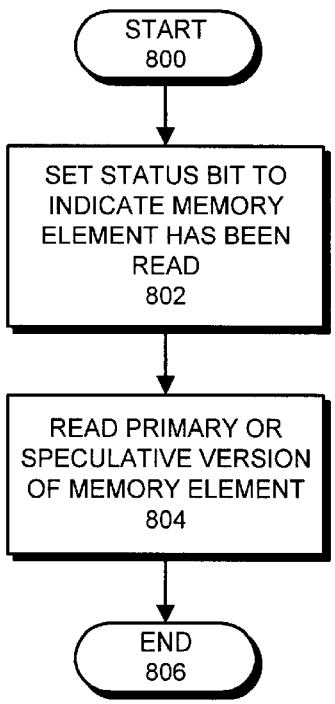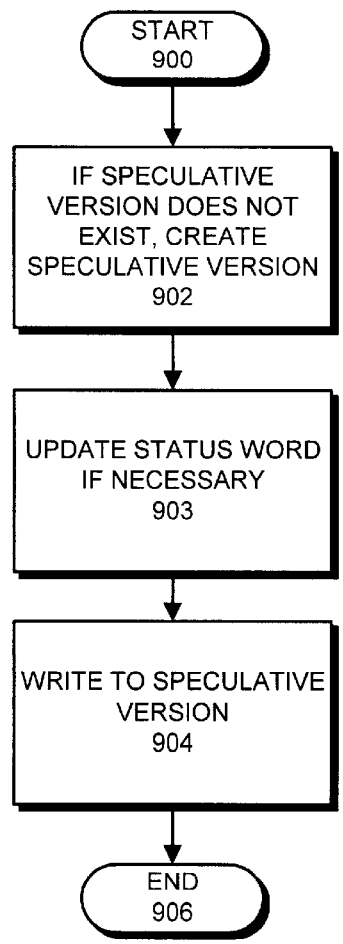
FIG. 7
FIG. 8
FIG. 9

SUPPORTING INTER-PROCESS COMMUNICATION THROUGH A CONDITIONAL TRAP INSTRUCTION

RELATED APPLICATION

This application hereby claims priority under 35 U.S.C. § 119 to U.S. Provisional Patent Application No. 60/185,246 filed Feb. 28, 2000.

BACKGROUND

1. Field of the Invention

The present invention relates to techniques for improving computer system performance. More specifically, the present invention relates to a method and an apparatus for supporting inter-process communication through use of a conditional trap instruction.

2. Related Art

As increasing semiconductor integration densities allow more transistors to be integrated onto a microprocessor chip, computer designers are investigating different methods of using these transistors to increase computer system performance. Some recent computer architectures exploit "instruction level parallelism," in which a single central processing unit (CPU) issues multiple instructions in a single cycle. Given proper compiler support, instruction level parallelism has proven effective at increasing computational performance across a wide range of computational tasks. However, inter-instruction dependencies generally limit the performance gains realized from using instruction level parallelism to a factor of two or three.

Another method for increasing computational speed is "speculative execution" in which a processor executes multiple branch paths simultaneously, or predicts a branch, so that the processor can continue executing without waiting for the result of the branch operation. By reducing dependencies on branch conditions, speculative execution can increase the total number of instructions issued.

Unfortunately, conventional speculative execution typically provides a limited performance improvement because only a small number of instructions can be speculatively executed. One reason for this limitation is that conventional speculative execution is typically performed at the basic block level, and basic blocks tend to include only a small number of instructions. Another reason is that conventional hardware structures used to perform speculative execution can only accommodate a small number of speculative instructions.

What is needed is a method and apparatus that facilitates speculative execution of program instructions at a higher level of granularity so that many more instructions can be speculatively executed.

One challenge in designing a system that supports speculative execution is to provide an efficient mechanism for communication between speculative threads and other threads in the computer system. Conventional shared memory communication mechanisms are typically slow and inefficient, because accesses to shared variables require time-consuming load operations, and can sometimes cause cache lines to ping-pong back and forth between caches. Slow communications are particularly a problem for frequently executed communication operations. For example, a speculative thread may have to communicate frequently with a non-speculative thread in order to determine when to perform a join operation to merge the state of the speculative thread into the state of the non-speculative thread. If these frequent communications are too slow, the performance advantages of speculative execution can be lost.

Hence, what is needed is a method and an apparatus that facilitates efficient inter-process communications in a multiprocessor system to support speculative execution.

SUMMARY

One embodiment of the present invention provides a system that supports inter-process communication through use of a conditional trap instruction. The system operates by allowing a first process to send a communication to a second process by writing to a register that is visible to the second process. The second process then examines a value in the register by executing the conditional trap instruction to examine the value in the register. If the value in the register satisfies a condition specified by the conditional trap instruction, the system executes a trap handling routine that takes an action in response to the communication from the first process. If the value in the register does not satisfy the condition, the system takes no action and proceeds with execution of the code.

In one embodiment of the present invention, the first process writes to the register by causing an interrupt that writes to the register.

In one embodiment of the present invention, the first process is a head thread and the second process is a speculative thread that speculatively executes program instructions in advance of the head thread while the head thread is executing. In this embodiment, the head thread communicates with the speculative thread in order to inform the speculative thread that the speculative thread can perform a join operation with the head thread. In a variation on this embodiment, the system keeps track of how many locks the speculative thread is holding, and executes the conditional trap instruction only if the speculative thread is holding no locks. In this way, the speculative thread only performs the join operation when the speculative thread is holding no locks.

In one embodiment of the present invention, the conditional trap instruction is located within code that implements a monitor exit operation.

In one embodiment of the present invention, the register is a processor status register within a processor on which the second process is running. In this embodiment, the conditional trap instruction examines a conditional trap bit in the processor status register.

In one embodiment of the present invention, the first process and the second process execute on different processors within a multi-processor system.

In one embodiment of the present invention, the conditional trap instruction is located within a very long instruction word (VLIW) instruction.

In one embodiment of the present invention, the conditional trap instruction is a bounds check instruction.

BRIEF DESCRIPTION OF THE FIGURES

FIG. 7 is a flow chart illustrating operations involved in performing a write to a memory element by a head thread in accordance with an embodiment of the present invention.

FIG. 8 is a flow chart illustrating operations involved in performing a read to a memory element by a speculative thread in accordance with an embodiment of the present invention.

FIG. 9 is a flow chart illustrating operations involved in performing a write to a memory element by a speculative thread in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may carry information across a communications network, such as the Internet.

Computer System

Figure 1:
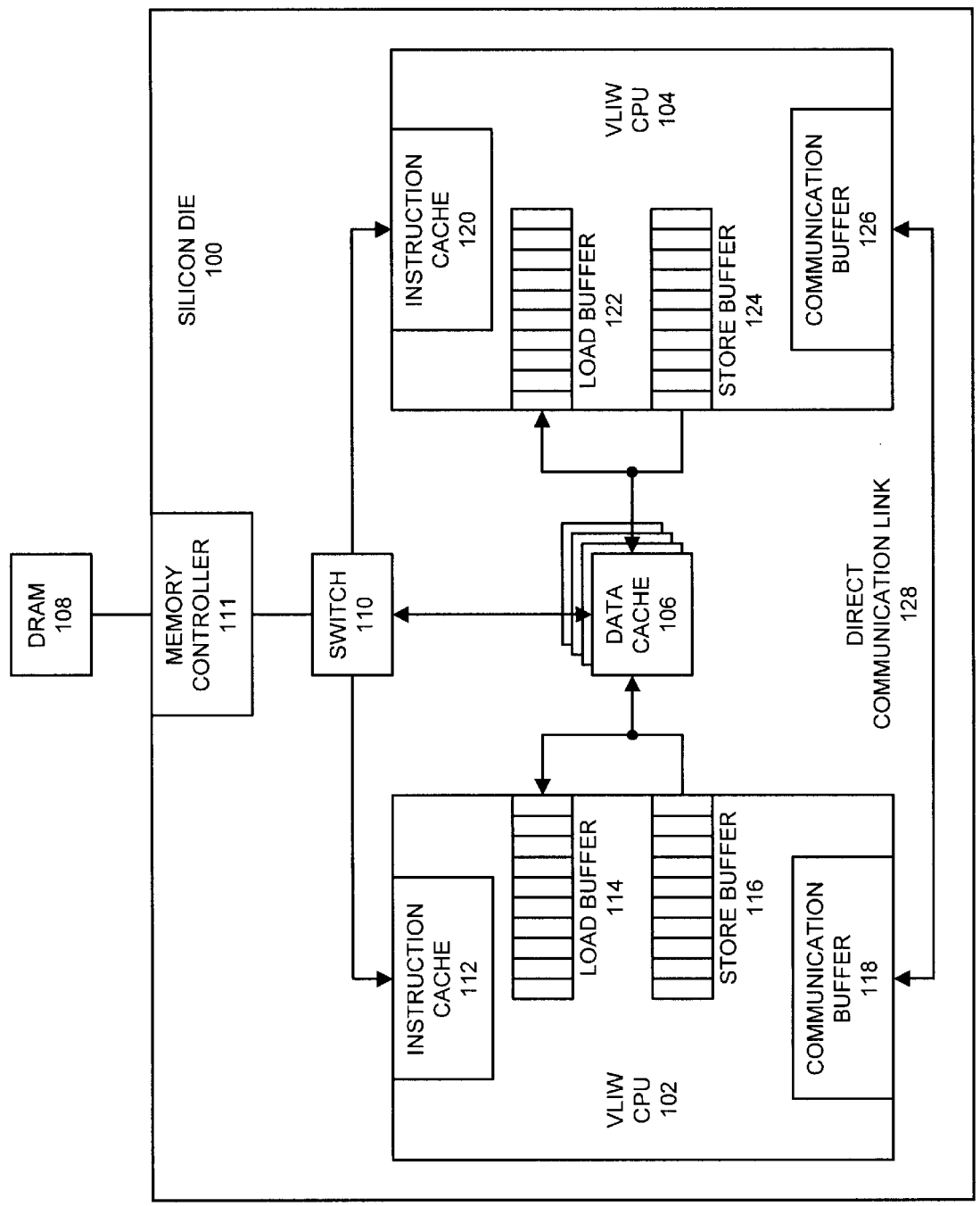
FIG. 1 illustrates a computer system including two central processing units sharing a common data cache in accordance with an embodiment of the present invention.

FIG. 1 illustrates a computer system including two central processing units (CPUs) 102 and 104 sharing a common data cache 106 in accordance with an embodiment of the present invention. In this embodiment, CPUs 102 and 104 and data cache 106 reside on silicon die 100. Note that CPUs 102 and 104 may generally be any type of computational devices that allow multiple threads to execute concurrently. In the embodiment illustrated in FIG. 1, CPUs 102 and 104 are very long instruction word (VLIW) CPUs, which support concurrent execution of multiple instructions executing on multiple functional units. VLIW CPUs 102 and 104 include instruction caches 112 and 120, respectively, containing instructions to be executed by VLIW CPUs 102 and 104.

VLIW CPUs 102 and 104 additionally include load buffers 114 and 122 as well as store buffers 116 and 124 for buffering communications with data cache 106. More specifically, VLIW CPU 102 includes load buffer 114 for buffering loads received from data cache 106, and store buffer 116 for buffering stores to data cache 106. Similarly, VLIW CPU 104 includes load buffer 122 for buffering loads received from data cache 106, and store buffer 124 for buffering stores to data cache 106.

VLIW CPUs 102 and 104 are additionally coupled together by direct communication link 128, which facilitates rapid communication between VLIW CPUs 102 and 104. Note that direct communication link 128 allows VLIW CPU 102 to write into communication buffer 126 within VLIW CPU 104. It also allows VLIW CPU 104 to write into communication buffer 118 within VLIW CPU 102.

In the embodiment illustrated in FIG. 1, Data cache 106 is fully dual-ported allowing concurrent read and/or write accesses from VLIW CPUs 102 and 104. This dual porting eliminates cache coherence delays associated with conventional shared memory architectures that rely on coherent caches.

In one embodiment of the present invention, data cache 106 is a 16K byte 4-way set-associative data cache with 32 byte cache lines.

Data cache 106, instruction caches 112 and instruction cache 120 are coupled through switch 110 to memory controller 111. Memory controller 111 is coupled to dynamic random access memory (DRAM) 108, which is located off chip. Switch 110 may include any type of circuitry for switching signal lines. In one embodiment of the present invention, switch 110 is a cross bar switch.

The present invention generally applies to any computer system that supports concurrent execution by multiple threads and is not limited to the illustrated computing system. However, note that data cache 106 supports fast accesses to shared data items. These fast accesses facilitate efficient sharing of status information between VLIW CPUs 102 and 104 to keep track of accesses to versions of memory objects.

Space-Time Dimensional Execution of Methods

Figure 2A:
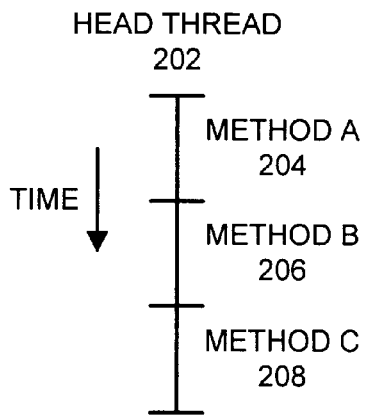
FIG. 2A illustrates sequential execution of methods by a single thread.

FIG. 2A illustrates sequential execution of methods in a conventional computer system by a single head thread 202.

In executing a program, head thread 202 executes a number of methods in sequence, including method A 204, method B 206 and method C 208.

Figure 2B:
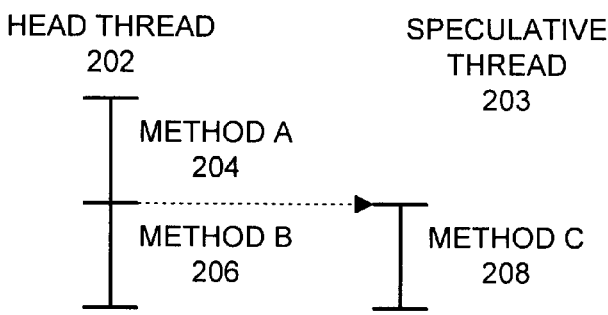
FIG. 2B illustrates space and time dimensional execution of a method in accordance with an embodiment of the present invention.

In contrast, FIG. 2B illustrates space and time dimensional execution of a method in accordance with an embodiment of the present invention. In FIG. 2B, head thread 202 first executes method A 204 and then executes method B 206. (For this example, assume that method B 206 returns a void or some other value that is not used by method C 208. Alternatively, if method C 208 uses a value returned by method B206, assume that method C 208 uses a predicted return value from method B 206.)

As head thread 202 executes method B 206, speculative thread 203 executes method C 208 in a separate space-time dimension of the heap. If head thread 202 successfully executes method B 206, speculative thread 203 is joined with head thread 202. This join operation involves causing state associated with the speculative thread 203 to be merged with state associated with the head thread 202 and the collapsing of the space-time dimensions of the heap.

If speculative thread 203 for some reason encounters problems in executing method C 208, speculative thread 203 performs a rollback operation. This rollback operation allows speculative thread 203 to reattempt to execute method C 208. Alternatively, head thread 202 can execute method C 208 non-speculatively and speculative thread 203 can execute a subsequent method.

There are a number of reasons why speculative thread 203 may encounter problems in executing method C 208. One problem occurs when head thread 202 executing method B 206 writes a value to a memory element (object) after speculative thread 203 has read the same memory element. The same memory element can be read when the two space-time dimensions of the heap are collapsed at this memory element at the time of the read by speculative thread 203. In this case, speculative thread 203 should have read the value written by head thread 202, but instead has read a previous value. In this case, the system causes speculative thread 203 to roll back so that speculative thread 203 can read the value written by head thread 202.

Note that the term "memory element" generally refers to any unit of memory that can be accessed by a computer program. For example, the term "memory element" may refer to a bit, a byte or a word memory, as well as a data structure or an object defined within an object-oriented programming system.

Figure 3:
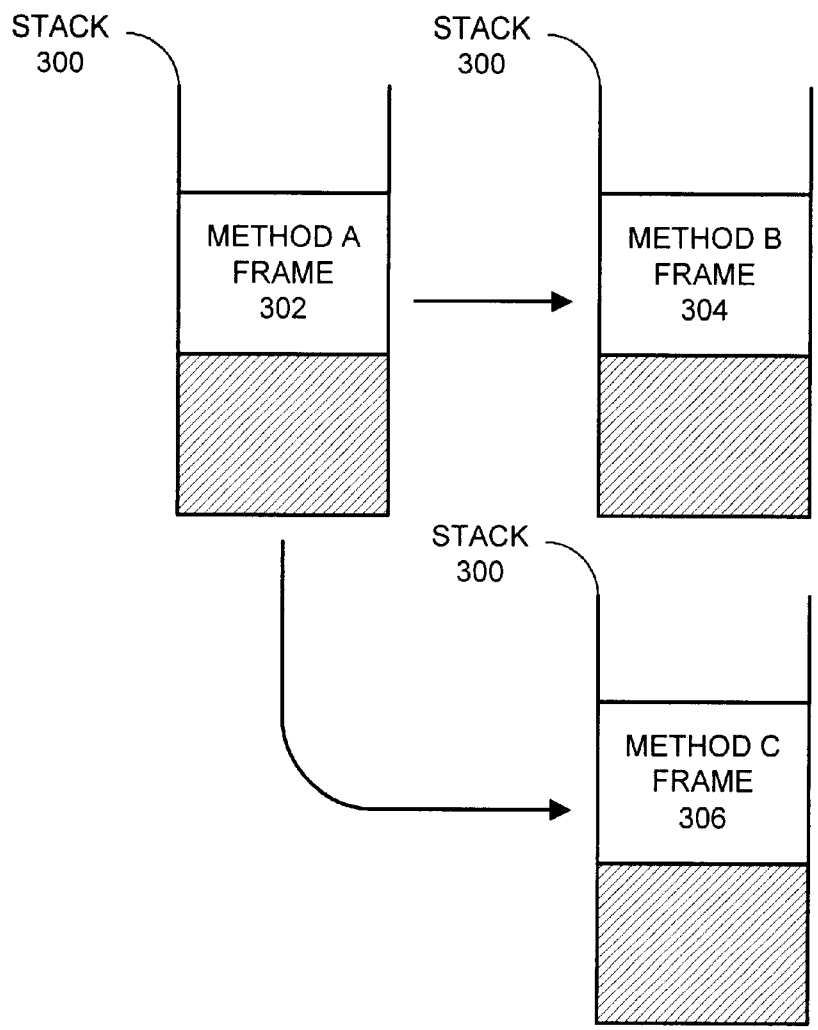
FIG. 3 illustrates the state of the system stack during space and time dimensional execution of a method in accordance with an embodiment of the present invention.

FIG. 3 illustrates the state of the system stack during space and time dimensional execution of a method in accordance with an embodiment of the present invention. Note that since programming languages such as the Java programming language do not allow a method to modify the stack frame of another method, the system stack will generally be the same before method B 206 is executed as it is before method C 208 is executed. (This is not quite true if method B 206 returns a parameter through the system stack. However, return parameters are can be explicitly dealt with as is described below.) Referring the FIG. 3, stack 300 contains method A frame 302 while method A 204 is executing. When method A 204 returns, method B 206 commences and method A frame 302 is replaced by method B frame 304. Finally, when method B 206 returns, method C 208 commences and method B frame 304 is replaced by method C frame 306. Note that since stack 300 is the same immediately before method B 206 executed as it is immediately before method C 208 is executed, it is possible to execute method C 208 using a copy of stack 300 without first executing method B 206.

In order to undo the results of speculatively executed operations, updates to memory need to be versioned. The overhead involved in versioning all updates to memory can be prohibitively expensive due to increased memory requirements, decreased cache performance and additional hardware required to perform the versioning.

Fortunately, not all updates to memory need to be versioned. For example, updates to local variables—such as a loop counter—on a system stack are typically only relevant to the thread that is updating the local variables. Hence, even for speculative threads versioning updates to these local variables is not necessary.

When executing programs written in conventional programming languages, such as C, it is typically not possible to determine which updates are related to the heap, and which updates are related to the system stack. These programs are typically compiled from a high-level language representation into executable code for a specific machine architecture. This compilation process typically removes distinctions between updates to heap and system stack.

The same is not true for new platform-independent computer languages, such as the JAVA™ programming language distributed by SUN Microsystems, Inc. of Palo Alto, Calif. (Sun, the Sun logo, Sun Microsystems, and Java are trademarks or registered trademarks of Sun Microsystems, Inc. in the United States and other countries.) A program written in the Java programming language is typically compiled into a class file containing Java byte codes. This class file can be transmitted over a computer network to a distant computer system to be executed on the distant computer system. Java byte codes are said to be "platform-independent," because they can be executed across a wide range of computing platforms, so long as the computing platforms provide a Java virtual machine.

A Java byte code can be executed on a specific computing platform by using an interpreter or a just in time (JIT) compiler to translate the Java byte code into machine code for the specific computing platform. Alternatively, a Java byte code can be executed directly on a Java byte code engine running on the specific computing platform.

Fortunately, a Java byte code contains more syntactic information than conventional machine code. In particular, the Java byte codes differentiate between accesses to local variables in the system stack and accesses to the system heap. Furthermore, programs written in the Java programming language do not allow conversion between primitive and reference types. Such conversion can make it hard to differentiate accesses to the system stack from accesses to the system heap at compile time.

Data Structures to Support Space-Time Dimensional Execution

Figure 4:
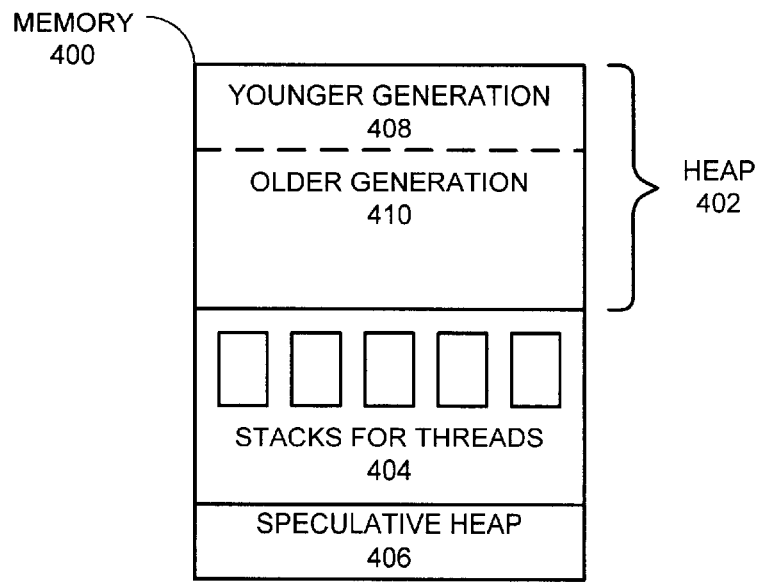
FIG. 4 illustrates how memory is partitioned between stack and heap in accordance with an embodiment of the present invention.
Figure 5:
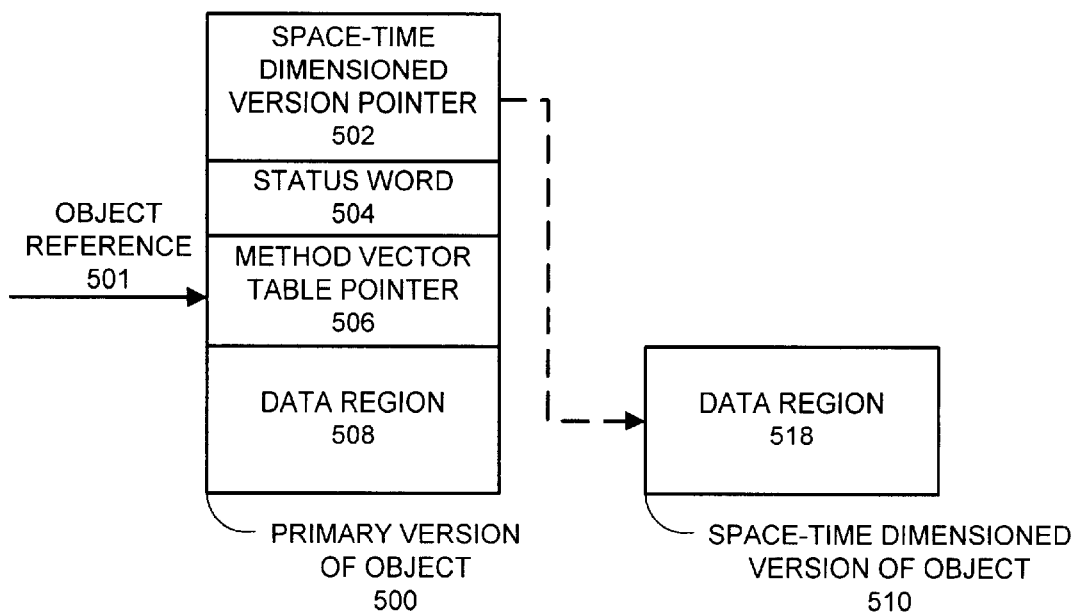
FIG. 5 illustrates the structure of a primary version and a space-time dimensioned version of an object in accordance with an embodiment of the present invention.

FIG. 4 illustrates how memory is partitioned between stack and heap in accordance with an embodiment of the present invention. In FIG. 4, memory 400 is divided into a number of regions including heap 402, stacks for threads 404 and speculative heap 406. Heap 402 comprises a region of memory from which objects are allocated. Heap 402 is further divided into younger generation region 408 and older generation region 410 for garbage collection purposes. For performance reasons, garbage collectors typically treat younger generation objects differently from older generation objects. Stack for threads 404 comprises a region of memory from which stacks for various threads are allocated. Speculative heap 406 contains the space-time dimensioned values of all memory elements where the two space-time dimensions of the heap are not collapsed. This includes space-time dimensional versions of objects, for example, version 510 of object 500 as shown in FIG. 5, and objects created by speculative thread 203. For garbage collection purposes, these objects created by speculative thread 203 can be treated as belonging to a generation that is younger than objects within younger generation region 408.

FIG. 5 illustrates the structure of a primary version of object 500 and a space-time dimensioned version of object 510 in accordance with an embodiment of the present invention.

Primary version of object 500 is referenced by object reference pointer 501. Like any object defined within an object-oriented programming system, primary version of object 500 includes data region 508, which includes one or more fields containing data associated with primary version of object 500. Primary version of object 500 also includes method vector table pointer 506. Method vector table pointer 506 points to a table containing vectors that point to the methods that can be invoked on primary version of object 500.

Primary version of object 500 also includes space-time dimensioned version pointer 502, which points to space-time dimensioned version of object 510, if the two space-time dimensions are not collapsed at this object. Note that in the illustrated embodiment of the present invention, space-time dimensioned version 510 is always referenced indirectly through space-time dimensioned version pointer 502. Primary version of object 500 additionally includes status word 504, which contains status information specifying which fields from data region 508 have been written to or read by speculative thread 203. Space-time dimensioned version of object 510 includes only data region 518.

Figure 6:
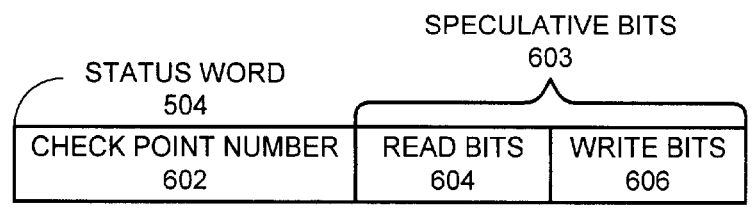
FIG. 6 illustrates the structure of a status word for an object in accordance with an embodiment of the present invention.

FIG. 6 illustrates the structure of status word 504 in accordance with an embodiment of the present invention. In this embodiment, status word 504 includes checkpoint number 602 and speculative bits 603. Speculative bits 603 includes read bits 604 and write bits 606. When status word 504 needs to be updated due to a read or a write by speculative thread 203, checkpoint number 602 is updated with the current time of the system. The current time in the time dimension of the system is advanced discretely at a join or a rollback. This allows checkpoint number 602 to be used as a qualifier for speculative bits 603. If checkpoint number 602 is less than the current time, speculative bits 603 can be interpreted as reset.

Read bits 604 keep track of which fields within data region 508 have been read since the last join or rollback. Correspondingly, write bits 606 keep track of which fields within data region 508 have been written since the last join or rollback. In one embodiment of the present invention, read bits 604 includes one bit for each field within data region 508. In another embodiment, read bits includes fewer bits than the number of fields within data region 508. In this embodiment, each bit within read bits 604 corresponds to more than one field in data region 508. For example, if there are eight read bits, each bit corresponds to every eighth field. Write bits 606 similarly can correspond to one or multiple fields within data region 508.

Space-Time Dimensional Update Process

Space-time dimensioning occurs during selected memory updates. For local variable and operand accesses to the system stack, no space-time dimensioned versions exist and nothing special happens. During read operations by head thread 202 to objects in the heap 402, again nothing special happens.

Special operations are involved in write operations by head thread 202 as well as read and write operations by speculative thread 203. These special operations are described in more detail with reference to FIGS. 7, 8 and 9 below.

FIG. 7 is a flow chart illustrating operations involved in a write operation to an object by a head thread 202 in accordance with an embodiment of the present invention. The system writes to the primary version of object 500 and the space-time dimensioned version of object 510 if the two space-time dimensions are not collapsed at this point (step 702). Next, the system checks status word 504 within primary version of object 500 to determine whether a rollback is required (step 704). A rollback is required if speculative thread 203 previously read the data element. The same memory element can be read when the two space-time dimensions of the heap are collapsed at this memory element at the time of the read by speculative thread 203. A rollback is also required if speculative thread 203 previously wrote to the object and thus ensured that the two dimensions of the object are not collapsed at this element, and if the current write operation updates both primary version of object 500 and space-time dimensioned version of object 510.

If a rollback is required, the system causes speculative thread 203 to perform a rollback operation (step 706). This rollback operation allows speculative thread 203 to read from (or write to) the object after head thread 202 writes to the object.

Note that in the embodiment of the present invention illustrated in FIG. 7 the system performs writes to both primary version 500 and space-time dimensioned version 510. In an alternative embodiment, the system first checks to determine if speculative thread 203 previously wrote to space-time dimensioned version 510. If not, the system writes to both primary version 500 and space-time dimensioned version 510. If so, the system only writes to primary version 500.

FIG. 8 is a flow chart illustrating operations involved in a read operation to an object by speculative thread 203 in accordance with an embodiment of the present invention. During this read operation, the system sets a status bit in status word 504 within primary version of object 500 to indicate that primary version 500 has been read (step 802). Speculative thread 203 then reads space-time dimensioned version 510, if it exists. Otherwise, speculative thread 203 reads primary version 500.

FIG. 9 is a flow chart illustrating operations involved in a write operation to a memory element by speculative thread 203 in accordance with an embodiment of the present invention. If a space-time dimensioned version 510 does not exist, the system creates a space-time dimensioned version 510 in speculative heap 406 (step 902). The system also updates status word 504 to indicate that speculative thread 203 has written to the object if such updating is necessary (step 903). The system next writes to space-time dimensioned version 510 (step 904). Such updating is necessary if head thread 202 must subsequently choose between writing to both primary version 500 and space-time dimensioned version 510, or writing only to primary version 500 as is described above with reference to FIG. 7.

Figure 10:
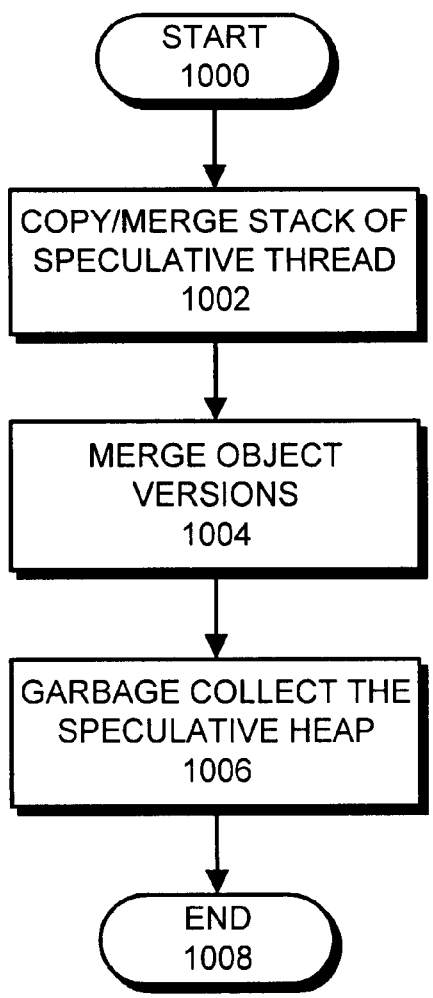
FIG. 10 is a flow chart illustrating operations involved in performing a join between a head thread and a speculative thread in accordance with an embodiment of the present invention.

FIG. 10 is a flow chart illustrating operations involved in a join operation between head thread 202 and a speculative thread 203 in accordance with an embodiment of the present invention. A join operation occurs for example when head thread 202 reaches a point in the program where speculative thread 203 began executing. The join operation causes state associated with the speculative thread 203 to be merged with state associated with the head thread 202. This involves copying and/or merging the stack of speculative thread 203 into the stack of head thread 202 (step 1002). It also involves merging space-time dimension and primary versions of objects (step 1004) as well as possibly garbage collecting speculative heap 406 (step 1006). In one embodiment of the present invention, one of threads 202 or 203 performs steps 1002 and 1006, while the other thread performs step 1004.

Figure 11:
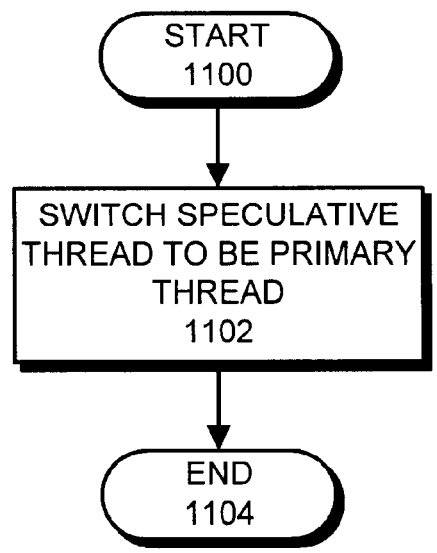
FIG. 11 is a flow chart illustrating operations involved in performing a join between a head thread and a speculative thread in accordance with another embodiment of the present invention.

FIG. 11 is a flow chart illustrating operations involved in a join operation between head thread 202 and a speculative thread 203 in accordance with another embodiment of the present invention. In this embodiment, speculative thread 203 carries on as a pseudo-head thread. As a pseudo-head thread, speculative thread 203 uses indirection to reference space-time dimensioned versions of objects, but does not mark objects or create versions. While speculative thread 203 is acting as a pseudo-head thread, head thread 202 updates primary versions of objects.

Inter-process Communication Through a Conditional Trap Instruction

Figure 12:
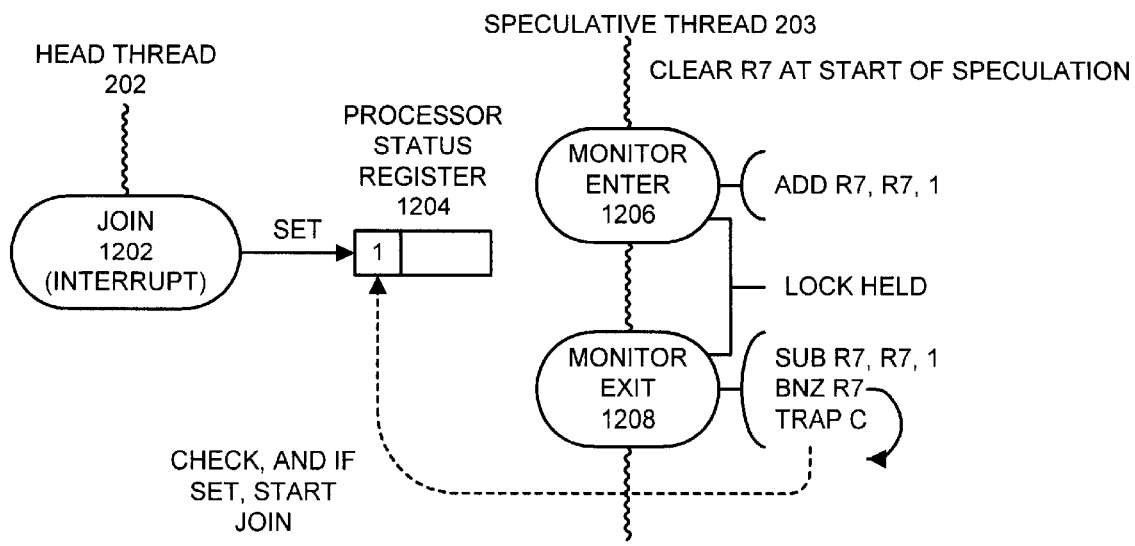
FIG. 12 illustrates how a head thread communicates with a speculative thread by using a conditional trap instruction in accordance with an embodiment of the present invention.

FIG. 12 illustrates how head thread 202 communicates with speculative thread 203 by using a conditional trap instruction in accordance with an embodiment of the present invention. When head thread 202 reaches a point in the program where speculative thread 203 began executing, head thread 202 causes an interrupt 1202 to initiate a join operation with speculative thread 203. This interrupt causes a bit to be set in processor status register 1204. (Note that processor status register (PSR) 1204 is located in the processor upon which speculative thread 203 is running.)

Speculative thread 203 starts by clearing a register R7. While speculative thread 203 is executing, speculative thread 203 keeps track of the number of locks that it is holding in register R7. (Note that if speculative thread 203 locks an object or a section of code, it will not cause head thread 202 to block. However, speculative thread 203 may have to roll back if head thread 202 and speculative thread 203 perform conflicting operations on the locked object, or within the locked section of code.)

As illustrated in the code fragments in FIG. 12, during a monitor entry operation 1206, speculative thread 203 increments the register R7, and during a monitor exit operation 1208, speculative thread 203 decrements the register R7. If speculative thread 203 no longer holds any locks, register R7 equals zero. This causes the branch BNZ not to be taken, and hence, the conditional trap operation "TRAPC" is be executed. Otherwise, if speculative thread 203 still holds locks, TRAPC will not be executed.

Note that it-is undesirable for speculative thread 203 to participate in a join operation if it still holds locks, because merging the state of speculative thread 203 into the state of head thread 202 can cause the state of speculative thread 203 to be inconsistent.

Also note that monitor entry and monitor exit operations are merely examples a general class of mutual exclusion operations, which can also be used to accomplish the same purpose. For example, the same functions can be accomplished through use of atomic operations such as, fetch-and-add, test-and-set, test-set-lock, mutex lock/mutex unlock and semaphore operations.

The TRAPC instruction examines the bit in processor status register 1204 that was written to by head thread 202. If the bit is set, TRAPC causes a trap handler to be executed to initiate the join operation. If the bit is not set, TRAPC does nothing (acts as a NOOP instruction) and allows speculative thread 203 to proceed with the next instruction.

Figure 13:
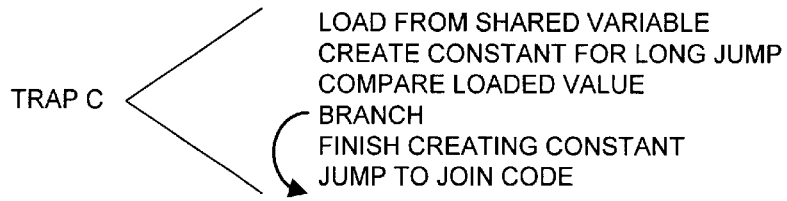
FIG. 13 illustrates how a conditional trap instruction replaces various load, compare and branch instructions in accordance with an embodiment of the present invention.

FIG. 13 illustrates how a conditional trap instruction replaces various load, compare and branch instructions in accordance with an embodiment of the present invention. These instructions (which are illustrated on the right-hand side of FIG. 13) would have been executed if head thread 202 and speculative thread 203 communicated through a shared memory location.

In addition to compare and branch instructions, these instructions include a time-consuming LOAD instruction, as well as instructions to create a target for a long jump instruction. Note that these instructions are executed even if the long jump to the join code is not taken. In contrast, the TRAPC instruction simply examines a bit in a processor register (which is a very fast operation) and does nothing if the trap is not taken.

Figure 14:
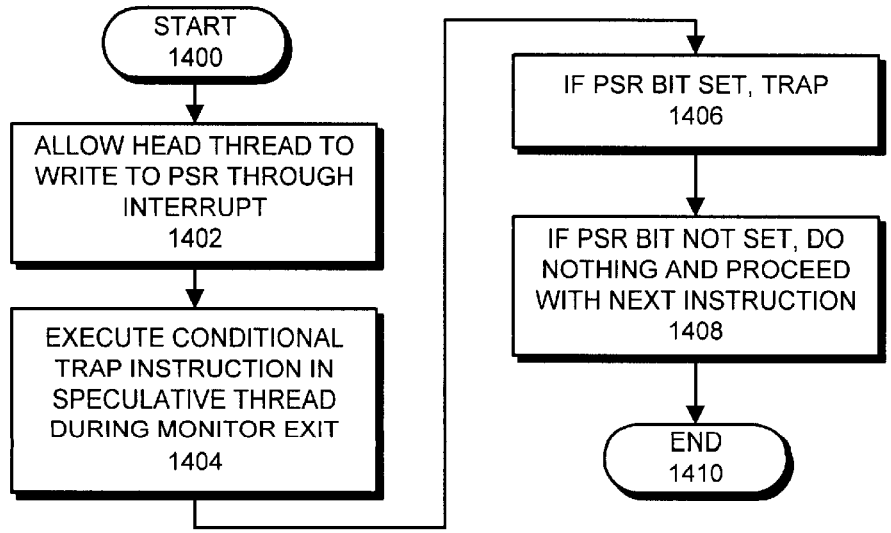
FIG. 14 is a flow chart illustrating how the conditional branch instruction operates in accordance with an embodiment of the present invention.

FIG. 14 is a flow chart illustrating how the conditional branch instruction operates in accordance with an embodiment of the present invention. When head thread 202 is ready to perform a join operation, head thread 202 writes to a bit in PSR 1204 through an interrupt. (step 1402). Next, while executing monitor exit code, speculative thread 203 checks to see if it is holding any remaining locks. If not, speculative thread 203 executes a conditional trap instruction (step 1404). This condition trap instruction examines the bit in PSR 1204.

If the bit has been set by head thread 202, head thread 202 is ready to perform a join operation. In this case, speculative thread 203 initiates a trap operation to perform the join operation (step 1406).

If the bit has not been set, the conditional trap instruction does nothing and speculative thread 203 proceeds to execute a subsequent instruction (step 1408). Note that in this case the conditional trap operation takes very little time to. execute.

Figure 15:
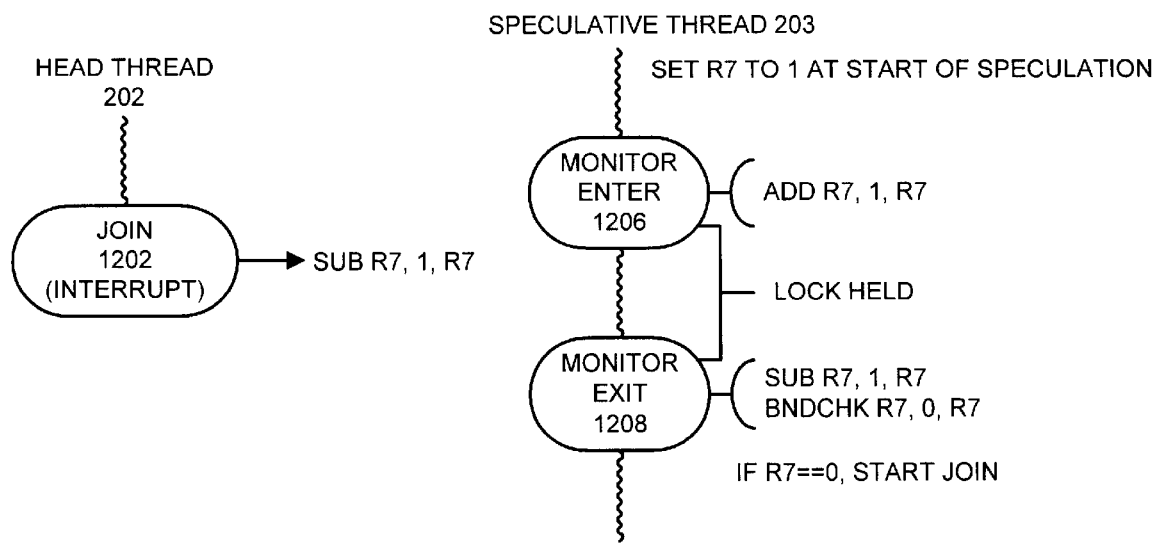
FIG. 15 illustrates how a head thread communicates with a speculative thread by using a bounds check instruction in accordance with an embodiment of the present invention.

FIG. 15 illustrates how head thread 202 communicates with speculative thread 203 by using a bounds check instruction in accordance with an embodiment of the present invention. Note that a bounds check instruction is another type of conditional trap instruction, which can be used instead of the TRAPC instruction that was described above with reference to FIGS. 12–14. When head thread 202 reaches a point in the program where speculative thread 203 began executing, head thread 202 causes an interrupt 1202 to initiate a join operation with speculative thread 203. This interrupt causes register R7 to be decremented.

Note that register R7 is initialized to the value one by speculative thread 203. R7 generally keeps track of how many locks are held by speculative thread 203. However, R7 also keeps track of whether a join operation is pending, because if the value of R7 reaches zero this means there are no remaining locks held by speculative thread 203, and that head thread 202 has initiated a join instruction causing register R7 to be decremented.

Speculative thread 203 starts by setting register R7 to one. While speculative thread 203 is executing, speculative thread 203 keeps track of the number of locks that it is holding in register R7.

As illustrated in the code fragments in FIG. 15, during a monitor entry operation 1206, speculative thread 203 increments the register R7, and during a monitor exit operation 1208, speculative thread 203 decrements the register R7. If speculative thread 203 no longer holds any locks and head thread has initiated a join operation, register R7 becomes equal to zero. This causes the bounds check instruction to trap to commence the join operation. Otherwise, speculative thread 203 proceeds with the next instruction.

Figure 16:
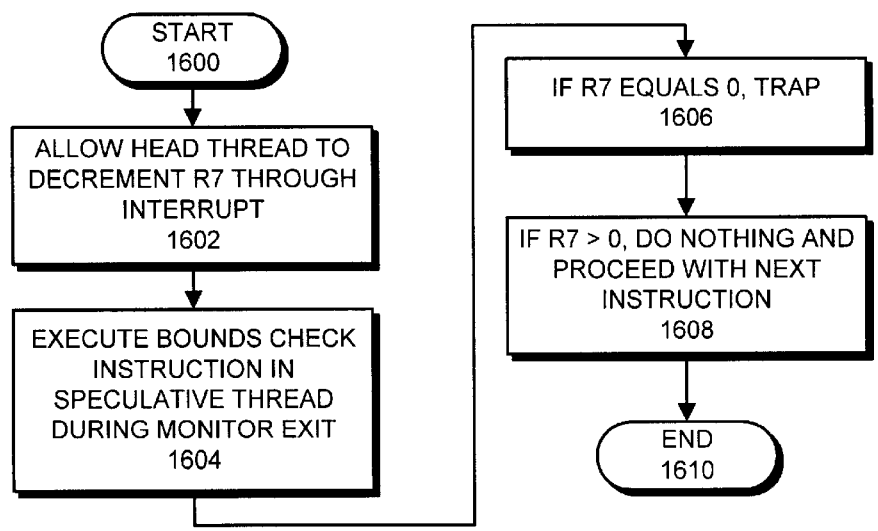
FIG. 16 is a flow chart illustrating how the head thread communicates with the speculative thread by using the bounds check instruction in accordance with an embodiment of the present invention.

FIG. 16 is a flow chart illustrating how the bounds check instruction is used in accordance with an embodiment of the present invention. When head thread 202 is ready to perform a join operation, head thread 202 decrements register R7 through an interrupt (step 1602). Next, while executing monitor exit code, speculative thread 203 checks to see if register R7 equals zero. If so, the bounds check instruction causes speculative thread 203 to initiate a trap operation to perform the join operation (step 1606).

If not, speculative thread 203 proceeds to execute a subsequent instruction (step 1608).

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for supporting inter-process communication through use of a conditional trap instruction, comprising:
   sending a communication from a first process to a second process at a predetermined point in the instruction sequence by executing an instruction that causes a write to a register that is visible to the second process;
   within the second process, examining a value in the register by executing the conditional trap instruction, which examines the value in the register, the conditional trap instruction being located within code being executed by the second process;
   if the value in the register satisfies a condition specified by the conditional trap instruction, executing a trap handling routine that takes an action in response to the communication from the first process; and
   if the value in the register does not satisfy the condition, taking no action and proceeding with execution of the code.

2. The method of claim 1, wherein the first process is a head thread and the second process is a speculative thread that speculatively executes program instructions in advance of the head thread while the head thread is executing, and wherein the head thread communicates with the speculative thread in order to inform the speculative thread that the speculative thread can perform a join operation with the head thread.

3. The method of claim 2, further comprising keeping track of how many locks the speculative thread is holding, and only executing the conditional trap instruction if the speculative thread is holding no locks, so that the speculative thread will only perform the join operation with the head thread if the speculative thread is holding no locks.

4. The method of claim 3, wherein the conditional trap instruction is located within code that implements a monitor exit operation.

5. The method of claim 1, wherein the first process writes to the register by causing an interrupt that writes to the register.

6. The method of claim 1, wherein the register is a processor status register for a processor on which the second process is running, and wherein the conditional trap instruction examines a conditional trap bit in the processor status register.

7. The method of claim 1, wherein the first process and the second process execute on different processors within a multi-processor system.

8. The method of claim 1, wherein the conditional trap instruction is located within a very long instruction word (VLIW) instruction.

9. The method of claim 1, wherein the conditional trap instruction is a bounds check instruction.

10. A computer-readable storage medium storing instructions that when executed by a computer cause the computer to perform a method for supporting inter-process communication through use of a conditional trap instruction, comprising:
    sending a communication from a first process to a second process at a predetermined point in the instruction sequence by executing an instruction that causes a write to a register that is visible to the second process;
    within the second process, examining a value in the register by executing the conditional trap instruction, which examines the value in the register, the conditional trap instruction being located within code being executed by the second process;
    if the value in the register satisfies a condition specified by the conditional trap instruction, executing a trap handling routine that takes an action in response to the communication from the first process; and
    if the value in the register does not satisfy the condition, taking no action and proceeding with execution of the code.

11. The computer-readable storage medium of claim 10, wherein the first process is a head thread and the second process is a speculative thread that speculatively executes program instructions in advance of the head thread while the head thread is executing, and wherein the head thread communicates with the speculative thread in order to inform the speculative thread that the speculative thread can perform a join operation with the head thread.

12. The computer-readable storage medium of claim 11, wherein the method further comprises keeping track of how many locks the speculative thread is holding, and only executing the conditional trap instruction if the speculative thread is holding no locks, so that the speculative thread will only perform the join operation with the head thread if the speculative thread is holding no locks.

13. The computer-readable storage medium of claim 12, wherein the conditional trap instruction is located within code that implements a monitor exit operation.

14. The computer-readable storage medium of claim 10, wherein the first process writes to the register by causing an interrupt that writes to the register.

15. The computer-readable storage medium of claim 10, wherein the register is a processor status register for a processor on which the second process is running, and wherein the conditional trap instruction examines a conditional trap bit in the processor status register.

16. The computer-readable storage medium of claim 10, wherein the first process and the second process execute on different processors within a multi-processor system.

17. The computer-readable storage medium of claim 10, wherein the conditional trap instruction is located within a very long instruction word (VLIW) instruction.

18. The computer-readable storage medium of claim 10, wherein the conditional trap instruction is a bounds check instruction.

19. An apparatus that supports inter-process communication through use of a conditional trap instruction, comprising:
    a first process that sends a communication to a second process at a predetermined point in the instruction sequence by executing an instruction that causes a write to a register that is visible to the second process;

the second process that is configured to examine a value in the register by executing the conditional trap instruction, which examines the value in the register, the conditional trap instruction being located within code being executed by the second process; and a conditional trap processing mechanism that is configured to, execute a trap handling routine that takes an action in response to the communication from the first process if the value in the register satisfies a condition specified by the conditional trap instruction, and to take no action and proceed with execution of the code if the value in the register does not satisfy the condition.

20. The apparatus of claim 19, wherein the first process is a head thread and the second process is a speculative thread that speculatively executes program instructions in advance of the head thread while the head thread is executing, and wherein the head thread communicates with the speculative thread in order to inform the speculative thread that the speculative thread can perform a join operation with the head thread.

21. The apparatus of claim 20, wherein the speculative thread is configured to keep track of how many locks the speculative thread is holding, and to only execute the conditional trap instruction if the speculative thread is holding no locks, so that the speculative thread will only perform the join operation with the head thread if the speculative thread is holding no locks.

22. The apparatus of claim 21, wherein the conditional trap instruction is located within code that implements a monitor exit operation.

23. The apparatus of claim 19, wherein the first process is configured to write to the register by causing an interrupt that writes to the register.

24. The apparatus of claim 19, wherein the register is a processor status register for a processor on which the second process is running, and wherein the conditional trap instruction is configured to examine a conditional trap bit in the processor status register.

25. The apparatus of claim 19, wherein the first process and the second process execute on different processors within a multi-processor system.

26. The apparatus of claim 19, wherein the conditional trap instruction is located within a very long instruction word (VLIW) instruction.

27. The apparatus of claim 19, wherein the conditional trap instruction is a bounds check instruction.

\* \* \* \* \*